(12) United States Patent
Blatherwick et al.

(10) Patent No.: US 11,820,872 B2
(45) Date of Patent: Nov. 21, 2023

(54) COMPOSITE MOULDING MATERIALS

(71) Applicant: APPLIED GRAPHENE MATERIALS UK LIMITED, Redcar (GB)

(72) Inventors: Nigel Ashley Blatherwick, Yorkshire (GB); Matthew David Sharp, Yorkshire (GB); William Weaver, Yorkshire (GB)

(73) Assignee: Applied Graphene Materials UK Limited, Redcar (GB)

( * ) Notice: Subject to any disclaimer, the term of this patent is extended or adjusted under 35 U.S.C. 154(b) by 0 days.

(21) Appl. No.: 16/611,017

(22) PCT Filed: May 9, 2018

(86) PCT No.: PCT/GB2018/051236
§ 371 (c)(1),
(2) Date: Nov. 5, 2019

(87) PCT Pub. No.: WO2018/206938
PCT Pub. Date: Nov. 15, 2018

(65) Prior Publication Data
US 2020/0123331 A1 Apr. 23, 2020

(30) Foreign Application Priority Data
May 9, 2017 (GB) ..................... 1707428

(51) Int. Cl.
*B29B 11/16* (2006.01)
*B29C 70/02* (2006.01)
(Continued)

(52) U.S. Cl.
CPC ............. *C08J 5/005* (2013.01); *B29B 11/16* (2013.01); *B29C 70/028* (2013.01); *B29C 70/06* (2013.01);
(Continued)

(58) Field of Classification Search
CPC ..... B29B 11/16; B29C 70/025; B29C 70/887; B29C 70/028; B29C 70/06;
(Continued)

(56) References Cited

U.S. PATENT DOCUMENTS 4,285,661 A 8/1981 Yotsutsuji et al.
5,643,502 A 7/1997 Nahass et al.
(Continued)

FOREIGN PATENT DOCUMENTS

CN 105437562 A 3/2016
EP 3000922 A1 3/2016
(Continued)

OTHER PUBLICATIONS

English Translation of Japanese Office action issued in Japanese Serial No. 2019-562416 dated Jun. 23, 2020, 5 pages.
(Continued)

*Primary Examiner* — Michael A Tolin
(74) *Attorney, Agent, or Firm* — Pearne & Gordon LLP

(57) ABSTRACT

A method of manufacture of a composite moulding material (1100) comprising a fibrous layer (1102) and a graphene/graphitic dispersion (1104) applied to the fibrous layer (1102) at one or more localised regions (1106) over a surface (1108) of the fibrous layer(1102) in which the graphene/graphitic dispersion (1104) is comprised of graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphite nanoplates of 6 to 14 layers of carbon atoms, graphite flakes with nanoscale dimensions and 40 or less layers of carbon atoms, graphite flakes with nanoscale dimensions and 25 to 30 layers of carbon atoms, (Continued)

graphite flakes with nanoscale dimensions and 25 to 35 layers of carbon atoms, graphite flakes with nanoscale dimensions and 20 to 35 layers of carbon atoms, or graphite flakes with nanoscale dimensions and 20 to 40 layers of carbon atoms, in which the dispersion (1104) is applied to the fibrous layer (1102) using at least one valvejet print head (1112).

21 Claims, 10 Drawing Sheets

(51) Int. Cl.
| | | |
|---|---|---|
| *B29C 70/88* | (2006.01) | |
| *B29K 307/04* | (2006.01) | |
| *B32B 5/24* | (2006.01) | |
| *C08J 5/00* | (2006.01) | |
| *C08J 5/06* | (2006.01) | |
| *B29C 70/06* | (2006.01) | |
| *B29K 101/00* | (2006.01) | |

(52) U.S. Cl.
CPC .............. *B29C 70/887* (2013.01); *B32B 5/24* (2013.01); *C08J 5/06* (2013.01); *B29K 2101/00* (2013.01); *B29K 2307/04* (2013.01); *B32B 2255/02* (2013.01); *B32B 2255/20* (2013.01); *B32B 2264/108* (2013.01); *B32B 2305/08* (2013.01); *B32B 2307/514* (2013.01); *B32B 2307/72* (2013.01); *B41J 2202/05* (2013.01)

(58) Field of Classification Search
CPC .......... B29K 2105/162; B29K 2307/04; B29K 2507/04; B29K 2101/00; B32B 5/24; B32B 5/26; B32B 5/30; B32B 37/0038; B32B 37/24; B32B 2037/243; B32B 38/145; B32B 2255/02; B32B 2255/10; B32B 2255/20; B32B 2264/108; B32B 2305/08; B32B 2305/30; B32B 2307/514; B32B 2307/72; B41J 2/03; B41J 2/045; B41J 2202/05; B82Y 30/00; C08J 5/005; C08J 5/06; C08J 5/10; C08J 2300/00
See application file for complete search history.

(56) References Cited

U.S. PATENT DOCUMENTS

| | | | |
|---|---|---|---|
| 6,265,333 B1 | 7/2001 | Dzenis et al. | |
| 7,077,334 B2* | 7/2006 | Sachs ................... | B41J 2/1429 239/11 |
| 7,981,501 B2* | 7/2011 | Kwag ................... | B82Y 30/00 428/300.7 |
| 8,148,276 B2 | 4/2012 | Nejhad et al. | |
| 2003/0174994 A1 | 9/2003 | Garito et al. | |
| 2005/0216075 A1 | 9/2005 | Wang et al. | |
| 2006/0062983 A1 | 3/2006 | Irvin et al. | |
| 2006/0102871 A1 | 5/2006 | Wang et al. | |
| 2006/0148916 A1 | 7/2006 | Loh et al. | |
| 2006/0249705 A1 | 11/2006 | Wang et al. | |
| 2008/0292887 A1 | 11/2008 | Kim et al. | |
| 2010/0136316 A1 | 6/2010 | Kwag et al. | |
| 2010/0267883 A1 | 10/2010 | Bhatt | |
| 2011/0014466 A1 | 1/2011 | Hu et al. | |
| 2011/0134617 A1 | 6/2011 | Putsch | |
| 2011/0204296 A1 | 8/2011 | Conzen et al. | |
| 2011/0267673 A1 | 11/2011 | Agrawal et al. | |
| 2012/0067615 A1 | 3/2012 | Blaiszik et al. | |
| 2012/0277360 A1* | 11/2012 | Scheffer ................ | C08L 77/00 524/237 |
| 2013/0030340 A1 | 1/2013 | Vincent et al. | |
| 2013/0037481 A1 | 2/2013 | Lalouch et al. | |
| 2013/0101805 A1 | 4/2013 | Altshuler et al. | |
| 2013/0108831 A1 | 5/2013 | Wu et al. | |
| 2013/0291995 A1 | 11/2013 | Ballocchi et al. | |
| 2016/0082691 A1 | 3/2016 | Restuccia et al. | |
| 2016/0083871 A1* | 3/2016 | Meure .................... | D04H 3/12 524/1 |
| 2016/0276056 A1* | 9/2016 | Stolyarov .............. | C08J 3/11 |
| 2017/0120566 A1 | 5/2017 | Aldousari et al. | |
| 2020/0269522 A1 | 8/2020 | Blatherwick et al. | |

FOREIGN PATENT DOCUMENTS

| | | | | |
|---|---|---|---|---|
| EP | 3009468 A2 | 4/2016 | | |
| JP | 2008537573 A | 9/2008 | | |
| JP | 2012167005 A | 9/2012 | | |
| JP | 2013513737 A | 4/2013 | | |
| JP | 2013533189 A | 8/2013 | | |
| WO | 2008011765 A1 | 1/2008 | | |
| WO | 2008130738 A1 | 10/2008 | | |
| WO | 2012108371 A1 | 8/2012 | | |
| WO | 2016046134 A1 | 3/2016 | | |
| WO | WO-2016046128 A1 * | 3/2016 | .......... | B41J 2/14201 |
| WO | WO-2016046134 A1 * | 3/2016 | ............ | B41J 2/1433 |
| WO | 2016096681 A1 | 6/2016 | | |
| WO | 2017041171 A1 | 3/2017 | | |

OTHER PUBLICATIONS

English Translation of Korean Office action issued in Korean Serial No. 10-2019-7036156 dated Jun. 17, 2020, 7 pages.
International Search Report and Written Opinion in PCT/GB2018/051236 dated Aug. 22, 2018, 12 pages.
Search and Examination Report issued in GB1807535.8 dated Nov. 9, 2018, 2 pages.
Search and Examination Report issued in GB1906694.3 dated Jul. 19, 2019, 2 pages.
Malik, et al. "Advances in Ink-Jet Printing Technology of Textiles." Indian Journal of Fibre & Textile Research. vol. 30, Mar. 1, 2005, pp. 99-113.
Muc, et al. "Local Fibre Reinforcement of Holes in a Composite Multilayered Plates." Composite Structures, vol. 94, No. 4, 2011. 2 pages.
International Search Report and Written Opinion in PCT/GB2018/051237 dated Aug. 22, 2018, 12 pages.
Graf, et al. "Spatially Resolved Raman Spectroscopy of Single- and Few-Layer Graphene," Nano Letters, 7.2 (2007), Jul. 21, 2006, 6 pages.
Latil, et al. "Charge Carriers in Few-Layer Graphene Films," Physical Review Letters, 97, 2006, The American Physical Society, published Jul. 19, 2006, 4 pages.
"Shear Rate," Wikipedia, available at https://en.wikipedia.org/wiki/Shear_rate, accessed on Dec. 10, 2020, 2 pages.
Kwon, et al. "The Effect of Thickness and Chemical Reduction of Graphene Oxide on Nanoscale Friction." The Journal of Physical Chemistry, 8, 2018, 122, 543-47, published Sep. 19, 2017. 5 pages.
He, et al. "Inkjet printing ultra-large graphene oxide flakes." 2D Materials, vol. 4, 2017, published Mar. 10, 2017. 9 pages.
"Nanotechnologies—Vocabularies. Part 13: Graphene and related two-dimensional (2D) materials." BSI Standards Publication. Sep. 30, 2017. 32 pages.
Machine translation Office Action issued in corresponding Chinese Application No. 201880042457.5; dated Jan. 25, 2022.

* cited by examiner

COMPOSITE MOULDING MATERIALS

FIELD OF INVENTION

The present invention relates to composite moulding materials and in particular manufacture of fibre reinforced composite moulding materials comprising graphene and or graphite.

BACKGROUND

Fibre reinforced composites (FRC's) are widely used in many areas of manufacture, especially in the manufacture of high strength/lightweight structures, due to their relative light weight and high in-plane specific strength and stiffness characteristics.

FRC's typically have a laminate structure made up of a plurality of fibre reinforcement layers consolidated within a matrix resin. It is within the planes of the fibre reinforcement layers where the in-plane strength and stiffness is found. However, in comparison to the advantageous in-plane properties of FRC's, their out-of-plane (through-thickness) properties represent weakness, presenting vulnerability to delamination either from edges or as a result of external loads or damage and subsequent propagation, imperilling serviceability, overall integrity and potentially leading to catastrophic failure.

Various approaches have been made to improve resistance to such delamination in FRC's including stitching, Z-pinning, 3D weaving and insertion of toughening thermoplastic interleaves. However. all of these can have detrimental effects on in-plane mechanical properties.

It therefore remains a challenge to enhance fracture toughness and interlaminar strength to achieve improved fatigue performance without significant consequential detriment to in-plane strength or increase in weight.

STATEMENTS OF INVENTION

According to one aspect of the present invention there is provided a method of manufacture of a composite moulding material comprising a fibrous layer and a graphene/graphitic dispersion applied to the fibrous layer at one or more localised regions over a surface of the fibrous layer in which the graphene/graphitic material is comprised of graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphite nanoplates of 6 to 14 layers of carbon atoms, graphite flakes with nanoscale dimensions and 40 or less layers of carbon atoms, graphite flakes with nanoscale dimensions and 25 to 30 layers of carbon atoms, graphite flakes with nanoscale dimensions and 25 to 35 layers of carbon atoms, graphite flakes with nanoscale dimensions and 20 to 35 layers of carbon atoms, or graphite flakes with nanoscale dimensions and 20 to 40 layers of carbon atoms, and the dispersion is applied to the fibrous layer using at least one valvejet print head.

The graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene/graphite nanoplates of 6 to 14 layers of carbon atoms, graphite flakes with nanoscale dimensions and 40 or less layers of carbon atoms, graphite flakes with nanoscale dimensions and 25 to 30 layers of carbon atoms, graphite flakes with nanoscale dimensions and 20 to 35 layers of carbon atoms, graphite flakes with nanoscale dimensions and 25 to 35 layers of carbon atoms, or graphite flakes with nanoscale dimensions and 20 to 40 layers of carbon atoms are hereafter collectively referred to as "graphene/graphitic platelets". Graphene, graphene oxide, and/or reduced graphene oxide nanoplates typically have a thickness of 1 to 10 layers of carbon atoms, typically between 0.3 nm and 3 nm, and lateral dimensions ranging from around 100 nm to 100 µm.

Valvejet printing is a known form of drop on demand printing. Valvejet print heads incorporate at least one needle valve to control the flow of the ink or dispersion (hereafter referred to as "dispersion") to be used in the printing to or within the print head. The needle valve is actuated to open and close by a piezoelectric actuator or a solenoid. The dispersion or ink to be printed using the valvejet print head is stored in a reservoir under a positive pressure (a pressure in excess of atmospheric pressure). The dispersion is expelled from the print head via a nozzle as a result of the pressure under which it is stored. Alternatively, the dispersion may be stored at atmospheric pressure and pressurised prior to its expulsion from the print head via a nozzle.

A valvejet print head may comprise one or a plurality of nozzles. A plurality of valvejet print heads can be used together.

An advantage of use of one or more valvejet print heads to apply the dispersion is that the nozzle size in a valvejet print head can be significantly larger than is found in either thermal inkjets or piezoelectric inkjets. As a result, it has been found that for dispersions comprising particulate materials, such as graphene/graphitic platelets, larger sizes of particulate materials may be used without clogging of the nozzles than may be used with thermal inkjet or piezoelectric inkjet print heads. The use of larger graphene/graphitic platelets may give improved results in the finished composite moulding material.

Alternatively or additionally, for dispersions that can be applied using a thermal inkjet or piezoelectric inkjet print head, a valvejet print head is less likely to clog than a thermal inkjet or piezoelectric inkjet print head. This has the advantage that a valvejet print head is expected to require less maintenance and unclogging than thermal inkjet or piezoelectric inkjet print heads. This has significant benefits in terms of efficiency of ink use, efficiency of operation, and profits.

In some embodiments of the present invention one or more valvejet print head has a nozzle diameter of between 50 µm and 600 µm, 50 µm, 100 µm, 150 µm, 200 µm, 300 µm, 400 µm or 600 µm.

In some embodiments of the present invention the graphene/graphitic platelets may have an average platelet size (planar dimension) of up to 100 µm, a d90 size of between 5 µm and 25 µm, a d90 size of between 1 µm and 60 µm, a d50 size of between 5 µm and 12 µm, and or a d50 size of between 1 µm and 30 µm. The particle sizes being measured using a Mastersizer 3000.

A further advantage of use of a valvejet print head for the application of the dispersion is that the pressure/force that causes the dispersion to pass out of the nozzle of a valvejet print head is greater for a valvejet print head than a thermal inkjet or piezoelectric inkjet print head. This has the result that dispersions of higher viscosity may be applied using a valvejet print head than a thermal inkjet or piezoelectric inkjet print head.

In some embodiments of the present invention the dispersion may have a viscosity in the range 1 to 75 centipoise, 1 to 10000 centipoise, 1 to 7500 centipoise, 10 to 50 centipoise, 80 to 10000 centipoise, 80 to 7500 centipoise, 350 to 10000 centipoise, 350 to 7500 centipoise, approximately 20 centipoise, or approximately 300 centipoise as measured at a shear rate ($\dot{Y}$) of 10 $s^{-1}$ at 23° C.

In some embodiments of the present invention the or each valvejet print head may be provided with means to heat the print head. The print head may be heated to a temperature that does not damage the dispersion to be applied using the print head. In some embodiments of the present invention the or each print head may be heated to a temperature of up to 120° C. The ability to heat the print head is particularly advantageous if the dispersion is of a relatively high viscosity and lessens in viscosity on heating. For example, a dispersion with a viscosity of 30000 centipoise may be heated to 80° C. to give a dispersion of sufficiently low viscosity that it may be used in the method of the present invention. The reservoir in which the dispersion is stored may also be heated. The heating of the reservoir may be to the same temperature as the valvejet print head or to a different temperature In some embodiments of the present invention the dispersion is stored at or pressurised to a pressure of up to around 689.5 kpa (100 psi), up to around 2757.9 kpa (400 psi), or up to around 4826.3 kpa (700 psi).

A further advantage of use of one or more valvejet printing heads according to the present invention is that it is not necessary for the print heads to contact the surface of the fibrous layer on which graphene/graphitic dispersion is to be applied. This has the benefit that graphene/graphitic dispersion can be applied to rough or uneven surfaces.

It will be understood that the graphene/graphitic dispersion is a liquid that can be applied to a fibrous layer. Once applied the dispersion may become solid or at least a liquid of higher viscosity so forming a graphene/graphitic material on the surface of the fibrous layer. The process by which the dispersion becomes the material is dependent on the nature of the dispersion and may include, but not be limited to, evaporation of a solvent, chemical reaction, or thermochemical reaction.

The graphene/graphitic material may be selectively located at at least one and preferably a plurality of predetermined regions over a surface of the fibrous layer.

The regions may be spaced and discrete.

At least one of the one or more localized regions may cover a surface area on the fibrous layer of between 0.01 $mm^2$ and 1.5 $mm^2$, between 0.01 $mm^2$ and 1.0 $mm^2$, between 0.5 $mm^2$ and 1.5 $mm^2$, and typically of greater than 0.5 $mm^2$ or greater than 1 $mm^2$.

The graphene/graphitic material at the, each or at least one of the region(s) may comprise a single body of material or may comprise a plurality of discrete bodies within the region(s).

The graphene/graphitic material may form one or more islands on the surface of the fibrous layer, the or each island preferably being surrounded by one or more areas of fibrous material deficient in graphene/graphitic material. That is where there is no graphene/graphitic material.

Each body may be one such island.

The graphene/graphitic material may be located at or in an array or pattern of regions over a surface of the fibrous layer.

The array or pattern may be regular, such as a regular array of bands, stripes, circles, spots, squares, blocks, columns, rows, or an array aligned along the nominal vertices of polyhedral shapes, for example hexagons, pentagons or other tessellating shapes.

Alternatively, the array may be irregular or may be regular in part and irregular in other part.

Bodies of graphene/graphitic material at the or at least one of the region(s) may comprise an array or pattern of graphene/graphitic material over a surface of the fibrous layer.

The array or pattern may be regular, such as a regular array of bands, stripes, circles, spots, squares, blocks, columns, rows, or an array aligned along the nominal vertices of polyhedral shapes, for example hexagons, pentagons or other tessellating shapes.

Alternatively, the array may be irregular or may be regular in part and irregular in other part.

The graphene/graphitic material may be located at one or more regions where the properties of the graphene/graphitic material will be beneficial to a composite component moulded from the composite moulding material.

The graphene/graphitic material may be a dispersion comprising graphene/graphite platelets dispersed in a carrier medium.

The graphene/graphitic platelets may comprise platelets comprising a plurality of layers of graphene/graphite and may have an average thickness of between 0.8 and 12 nanometres, may be between 1.3 and 9.4 nanometres and may be between 2.5 and 6 nanometres.

The graphene/graphitic platelets may comprise up to 25 or up to 35 layers of graphene, may be between 5 and 25 or 5 and 35 layers of graphene, and may be between 5 and 15 or 25 to 35 layers of graphene.

The graphene/graphitic platelets may comprise one or more of graphene, graphene oxide, reduced graphene oxide, graphite, graphite oxide, or reduced graphite oxide with a general plate-like (platelet) planar conformation.

The graphene/graphitic platelets may have a carbon content of between 40 wt % and 99 wt % and may be between 97 wt % and 99 wt % for platelets of graphene or graphite, may be between 80 wt % and 99 wt % for platelets of reduced graphene oxide or reduced graphite oxide, and may be between 40 wt % and 60 wt % by weight for platelets of graphene oxide or graphite oxide.

The graphene/graphitic platelets may have an sp2 content of between 40 wt % and 98 wt % and may be between 95 wt % and 98 wt % for platelets of graphene or graphite, may be between 60 wt % and 95 wt % for platelets of reduced graphene oxide or reduced graphite oxide and may be between 40 wt % and 60 wt % for graphene oxide or graphite oxide.

The graphene/graphitic platelets may comprise between 1 wt % and 50 wt % oxygen, may be between 1 wt % and 3 wt % oxygen for platelets of graphene or graphite, may be between 5 wt % and 10 wt % for platelets of reduced graphene oxide or reduced graphite oxide, and may be between 20 wt % and 50 wt % for platelets of graphene oxide or graphite oxide.

The graphene/graphitic platelets may comprise a plurality of layers of graphene, graphene oxide and/or reduced graphene oxide embedded in graphitic carbon.

The carrier medium may comprise resin, such as thermoset resin which may comprise one or more of epoxy, polyester(unsaturated), phenolic, vinyl ester, polyurethane, silicone, polyimide, polyamideimide, bismaleimide, cyanate ester, benzoxazine.

Alternatively or in addition, the carrier medium may comprise thermoplastic resin which may comprise one or more of polyethylene (PE), polyethylene terephthalate (PET), polybutylene terephthalate (PBT), polycarbonate (PC), acrylonitrile butadiene styrene (ABS), polyamide (PA or nylon) and polypropylene (PP). High-performance thermoplastic resins—polyetheretherketone (PEEK), polyetherketone (PEK), polyamide-imide (PAI), polyarylsulfone (PAS), polyetherimide (PEI), polyethersulfone (PES), polyphenylene sulphide (PPS).

Alternatively or in addition, the carrier medium may comprise biobased resins which may comprise one or more of starch, starch caprolactone blends, polyesters—polyalkylene succinates, polyesteram ides, polyhydroxy alkanoates—polyvinyl butyral—polyvinyl valeate, polyhydroxy acids—polylacticacid—polyglycolic acid, cellulose acetate, furfural alcohol/furan resins, oil modified polyesters—vegetable oil modification—cashew nut oil modification.

Alternatively or in addition, the carrier medium may comprise deionised water and/or solvent, which may comprise one or more of hexane, benzene, toluene, xylene, diethylether, 1,4-dioxane, ethyl acetate, nbutyl acetate, t-butyl acetate, ethyl ethoxy propionate, propyleneglycol monomethyl ether acetate, methyl acetate, dimethylcarbonate, tetrahydrofuran, dichloromethane, acetone, methyl ethyl ketone, methyl isobutyl ketone, methyl propyl ketone, methyl isoamyl ketone, acetonitrile, dimethylformamide, dimethylsluphoxide, n-butanol, methanol, ethanol, n-propanol, isopropanol, butanol, glycols—ethylene glycol, propylene glycol, parachlorobenzotrifluoride.

Alternatively, or in addition, the carrier medium may be a low melting point crystalline material or a low melting point semi-crystalline material such as thermoplastic high molecular weight linear saturated co-polyesters. Such co-polyesters are commercially available from Bostik, Inc., USA under the name VITEL (trade mark). When the carrier medium is or includes such materials, the or each valvejet print head applying a dispersion comprising such a carrier medium may be heated with a heating means. The heating may be to a predetermined temperature at about or above the melting point of the carrier medium. The reservoir in which the dispersion is stored may also be heated.

The heating of the reservoir may be to the same temperature as the valvejet print head or to a different temperature.

The carrier medium may be the same as or otherwise compatible with resin in the fibrous layer.

The dispersion may have a graphene/graphitic material content in the range 0.001 wt % to 10 wt %, 0.001 wt % to 1 wt %, 0.01 wt % to 0.5 wt %, 0.01 wt % to 5 wt %.

The area density of graphene/graphitic dispersion applied to the fibrous layer may be in the range 1 mg/m$^2$ to 35000 mg/m$^2$, 1 mg/m$^2$ to 2000 mg/m$^2$, 10 mg/m$^2$ to 100 mg/m$^2$, 1000 mg/m$^2$ to 20000 mg/m$^2$, 1000 mg/m$^2$ to 10000 mg/m$^2$, or 10 mg/m$^2$ to 20 mg/m$^2$.

The graphene/graphitic material may be applied in droplets and the inter-droplet spacing may be between 0.01 mm and 0.5 mm or between 0.3 mm and 2 mm.

The droplets of graphene/graphitic material may be all of the same size in some embodiments of the present invention. In other embodiments, the droplets may be of different sizes. The varying of the sizes may be achieved by known techniques from grayscale print head technologies.

Use of valvejet print heads in the manufacture of a composite moulding material comprising a fibrous layer has the result that the graphene/graphitic material may be applied in any manner that enables the accurate location of the graphene/graphitic material at one or more selected regions across the surface of the fibrous layer, the said region(s) may be preselected as being at or anticipated to lie at stressed or potentially stressed locations within a composite component moulded from the composite moulding material.

The application of the graphene/graphitic material may be by a single pass of the print head or by multiple passes.

The or each valvejet print head may in some embodiments of the present invention be part of a mechanism in which the or each print head moves relative to the fibrous layer on which graphene/graphitic dispersion is to be applied. In some embodiments of the present invention the or each valvejet print head is part of a mechanism in which the or each print head remains in a fixed position and the fibrous layer on which graphene/graphitic dispersion is to be applied is moved relative to the or each print head. In some embodiments of the present invention the or each valvejet print head is part of a mechanism in which the or each print head and the fibrous layer on which graphene/graphitic dispersion is to be applied can both move relative to each other.

The fibrous layer may comprise fibrous material partially or fully impregnated with curable matrix resin and may be in the form of one or more of a prepreg, a partially cured prepreg, an uncured fibrous preform, a partially cured fibrous preform.

The fibrous layer may comprise one or more plies of fibrous material.

Alternatively or in addition, the fibrous layer may comprise, at least in part, dry fibrous material.

The fibrous material may comprise one or more forms of fibrous reinforcing materials for fibre reinforced composites, including one or more of woven mat, unwoven mat, continuous fabric, unidirectional fabric, braided fabric, knitted fabric, woven fabric, discontinuous mat, chopped fibres, 3D woven materials, single fibre tow, unidirectional prepreg, slit tape prepreg, tow prepreg.

The fibrous material may comprise one or more of carbon fibres, glass fibres, aramid fibres, plastic fibres, nylon fibres, terylene fibres, hemp fibres, wood fibres and/or other organic fibres or inorganic fibres.

The curable matrix resin of the fibrous layer may comprise resin, such as thermoset resin which may comprise one or more of epoxy, polyester(unsaturated), phenolic, vinyl ester, polyurethane, silicone, polyamide, polyamideimide, bismaleimide, cyanate ester, benzoxazine.

Alternatively or in addition, the curable matrix resin of the fibrous layer comprises thermoplastic resin which may comprise one or more of polyethylene (PE), polyethylene terephthalate (PET), polybutylene terephthalate (PBT), polycarbonate (PC), acrylonitrile butadiene styrene (ABS), polyamide (PA or nylon) and polypropylene (PP). High-performance thermoplastic resins—polyetheretherketone (PEEK), polyetherketone (PEK), polyamide-imide (PAI), polyarylsulfone (PAS), polyetherimide (PEI), polyethersulfone (PES), polyphenylene sulphide (PPS).

Alternatively or in addition, the curable matrix resin of the fibrous layer may comprise biobased resins which may comprise one or more of starch, starch caprolactone blends, polyesters—polyalkylene succinates, polyesteramides, polyhydroxy alkanoates—polyvinyl butyral—polyvinyl valeate, polyhydroxy acids—polylacticacid—polyglycolic acid, cellulose acetate, furfuralalcohol/furan resins, oil modified polyesters—vegetable oil modification—cashew nut oil modification.

The carrier may be the same resin as, substantially the same as, or otherwise compatible with the curable matrix resin.

The fibrous layer may comprise a laminate structure, which may comprise a plurality of plies of fibrous material, in which the fibrous material and/or the curable matrix resin may be the same or may differ between the plies.

The composite moulding material may comprise one or more outer layers that may cover any otherwise externally exposed graphene/graphitic material in the composite moulding material.

The outer layer(s) may comprise a fibrous layer.

According to a further aspect of the present invention there is provided a method of manufacture of a moulding laminate comprising a plurality of layers of composite moulding material manufactured as described in any of the preceding paragraphs.

The composite moulding material used in the manufacture may be the same in some and preferably all of the layers.

Alternatively, the composite moulding material used in the manufacture may differ between layers and each layer may be different to all other layers within the moulding laminate.

The layers of composite moulding material may be laminated, one on top of the other.

The layers may be laminated so that graphene/graphitic material on at least one or some of the layers is aligned or substantially aligned with graphene/graphitic material on at least one other layer within the moulding material in the out-of-plane direction. The out of plane direction being a direction approximately perpendicular to the plane of the layer or layers at the position of the graphene/graphitic material being considered.

The layers may be laminated so that some or all of the graphene/graphitic material on adjacent layers or on at least two adjacent layers is superimposed or substantially superimposed in the out-of-plane direction.

Alternatively, layers may be laminated so that graphene/graphitic material on adjacent layers is misaligned or substantially misaligned or at least some of the graphene/graphitic material on adjacent layers is misaligned or substantially misaligned between those layers.

The moulding laminate may comprise one or more outer laminate layers that may cover any otherwise externally exposed graphene/graphitic material in the moulding laminate.

The outer laminate layer(s) may be the same or substantially the same as a fibrous layer of composite moulding material in the moulding laminate.

According to a still further aspect of the present invention there is provided a method of manufacture of a fibre reinforced composite component comprising a plurality of fibrous layers held within a cured matrix resin and graphene/graphitic material at one or more localised regions between at least two of the fibrous layers to provide interlaminar fracture toughness at said region(s).

A dispersion for use in the present invention may be formulated by starting with a mixture of graphene/graphitic platelets (such as A-GNP35 commercially available from Applied Graphene Materials UK Limited, UK and comprising graphene platelets of between 6 and 14 layers of atoms thick) and Araldite® LY 556 epoxy resin (commercially available from Huntsman Advanced Materials Americas LLC, USA). To that mixture is added xylene. The mixture is combined with the xylene and the mixture degassed. The resultant mixture can be used as the graphene/graphitic dispersion in the present invention.

BRIEF DESCRIPTION OF DRAWINGS

Preferred embodiments of the present invention will now be described, by way of example only, with reference to the accompanying drawings, in which:

FIG. 10b is a diagrammatic cross-section along the line IXb of FIG. 9a;

DETAILED DESCRIPTION OF PREFERRED EMBODIMENTS

The invention provides a method of manufacture of a composite moulding material comprising a fibrous layer and a graphene/graphitic dispersion applied to the fibrous layer at one or more localised regions on a surface of the fibrous layer in which the dispersion is applied using one or more valvejet print heads.

Figure 1:
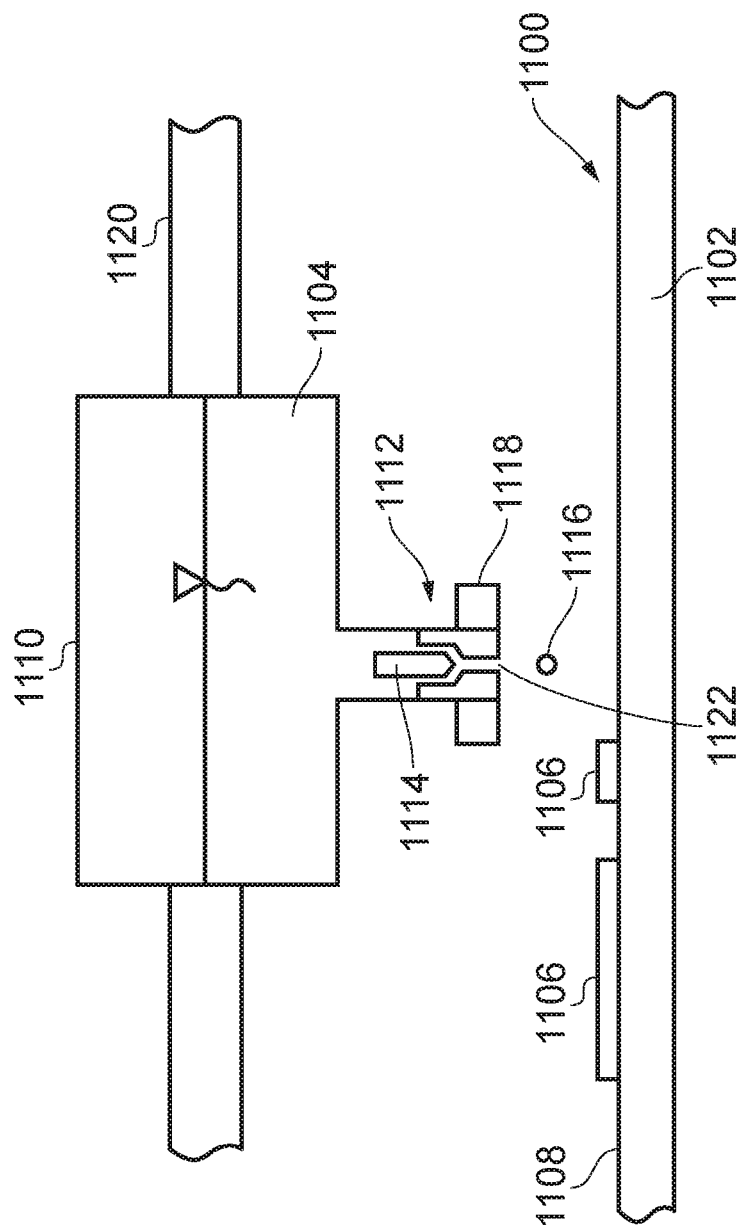
FIG. 1 is a schematic example of a method of manufacture of a composite moulding material comprising a fibrous layer and a graphene/graphitic dispersion.

FIG. 1 shows a schematic apparatus for performance of the method of manufacture of a composite moulding material 1101 comprising a fibrous layer 1102 and a graphene/graphitic dispersion 1104 applied to the fibrous layer at one or more localised regions 1106 on a surface 1108 of the fibrous layer 1102.

The graphene/graphitic dispersion 1104 is stored in a sealed reservoir 1110 at a pressure of around 689 kpa (100 psi). The reservoir 1110 is connected to and in fluid communication with a valvejet print head 1112. The valvejet print head 1112 includes a needle valve 1114 which is actuated to open and close by a piezoelectric actuator or a solenoid (not shown) and a nozzle 1122. Opening of the needle valve 1114 allows the graphene/graphitic dispersion 1104 to flow through the valve driven by the pressure in the reservoir 1110. Subsequent closure of needle valve 1114 stops the flow of the graphene/graphitic dispersion 1104 through the needle valve 1114 and causes the graphene/graphitic dispersion 1104 that has passed through the valve to form a droplet 1116. The inertia of the droplet 1116 causes it to exit the valvejet print head 1112 via the nozzle 1122 and impact the surface 1108 of the of the fibrous layer 1102. The droplet 1116 will then form the whole or part of a localised region 1106 of graphene/graphitic dispersion 1104.

The valvejet print head 1112 is provided with a heating means 1118 which can heat the valvejet print head 1112 if required. The reservoir 1110 is likewise provided with a heating means (not shown) which can heat the reservoir 1110 and the graphene/graphitic dispersion 1104 therein if so required. The heaters may be controlled together or independently by a control means (not shown).

The reservoir 1110 is mounted on a guide rail 1120. The mounting of the reservoir 1110 on the guide rail 1120 is such that the reservoir 1110 may move along the guide rail 1120. The mounting (not shown) may include a means (not shown) for powering that movement.

A control means (not shown) is provided which controls the actuation of the needle valve 1114 and movement of the reservoir 1110 along the guide rail 1120 so as to cause the creation of localised regions 1106 of the graphene/graphitic dispersion 1104 in desired predetermined positions on the surface of the fibrous layer 1102.

In other embodiments the reservoir 1110 may be separate from the valvejet print head 1112 but in fluid communication with the print head via a suitable conduit.

In other embodiments, the reservoir 1110 may be in fluid communication with two or more valvejet print heads 1112. They may be connected to or separate from the reservoir 1110.

In some embodiments the or each valvejet print head 1112 is held in a fixed position and the of the fibrous layer 1102 is moved relative to the or each valvejet print head 1112.

In some embodiments both the or each valvejet print head 1112 and the of the fibrous layer 1102 may move relative to each other and in absolute terms (that is with reference to a stationary point. The stationary point does not form part of the present invention). In some embodiments, the directions of movement of the or each valvejet print head 1112 and the of the fibrous layer 1102 differ by approximately 90°. The control means may further control the movement of the fibrous layer 1102.

In some embodiments of the present invention the or each valvejet print head may be mounted on alternative support means appropriate for the composite moulding material being manufactured. One alternative support means is comprised of one or more robotic arms each of which supports one or more valvejet print heads. Other alternative support means may be used and will fall within the scope of the present invention.

The or at least one valvejet print head may be mounted with a fixed directional orientation. Alternatively, the or at least one valvejet print head may be mounted via a means that allows or causes the directional orientation of the or at least one valvejet print head to be altered.

Figure 2:
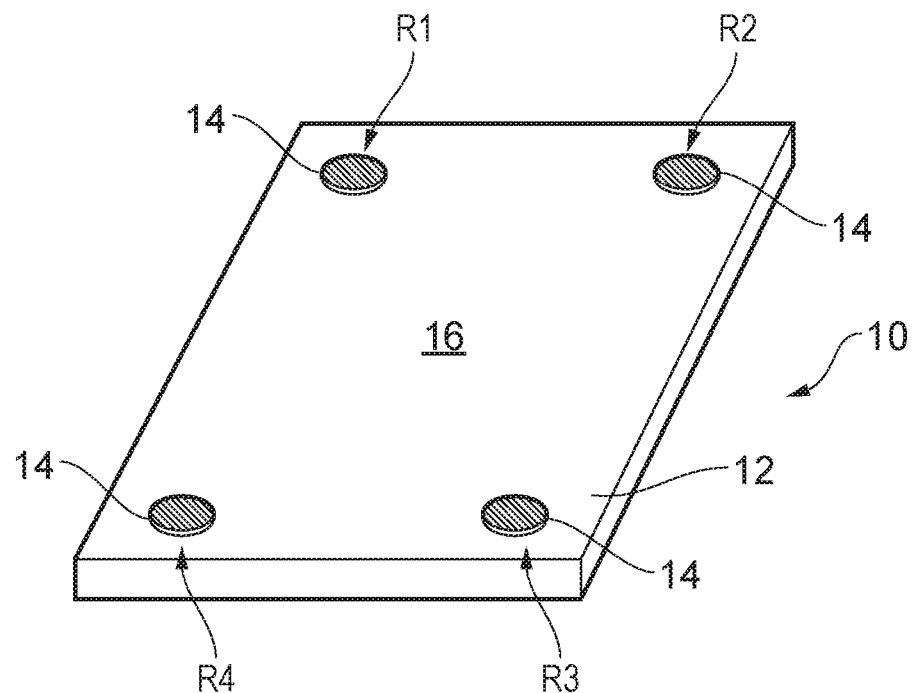
FIG. 2 is a diagrammatic perspective of a composite material made using an embodiment of the method of the present invention.

FIG. 2 illustrates one embodiment of a composite moulding material 10 manufactured according to the present invention which has a fibrous layer 12 and a graphene/graphitic material 14 applied to the fibrous layer 12 at four localised regions R1, R2, R3, R4 over the surface 16 of the fibrous layer 12.

The graphene/graphitic material 14 has been selectively applied at each of the predetermined regions R1, R2, R3, R4 on the surface 16 of the fibrous layer 12.

In the particular embodiment illustrated in FIG. 2, each of the four predetermined regions R1, R2, R3, R4 is located generally in a respective corner of the surface 16 of the fibrous layer 12. The regions R1, R2, R3, R4 are spaced from each other to provide discrete bodies of graphene/graphitic material 14. In the embodiment illustrated in FIG. 2 a single body of graphene/graphitic material 14 is provided in each region R1, R2, R3, R4.

The amount of graphene/graphitic material applied to the fibrous layer in a given region is determined according to a number of factors, including the nature of the graphene/graphitic material itself, the nature of the fibrous layer, the nature of any moulding laminate to be produced using the composite moulding material, the desired properties and characteristics, in particular interlaminar toughness and strength characteristics, required or sought for composite components to be formed using the composite moulding material.

By way of example, the graphene/graphitic material 14 in at least one of regions R1, R2, R3, R4 may cover a surface on the fibrous layer of between 0.01 and 1.5 $mm^2$ in certain embodiments, between 0.5 $mm^2$ and 1.5 $mm^2$ in other embodiments, between 0.01 $mm^2$ and 1.0 $mm^2$ in other embodiments, greater than 0.5 $mm^2$, or greater than 1 $mm^2$. The area covered may be considerably greater than 1 $mm^2$ if appropriate/required.

Each body of graphene/graphitic material 14 in the embodiment of FIG. 2 forms an island of graphene/graphitic material on the surface of the fibrous layer 12 and each island is surrounded by fibrous material deficient in graphene/graphite.

In the embodiment of FIG. 2 the graphene/graphitic material 14 is located in a regular array or pattern of regions with R1, R2, R3, R4 being aligned along the nominal vertices of a quadrilateral.

Figure 3:
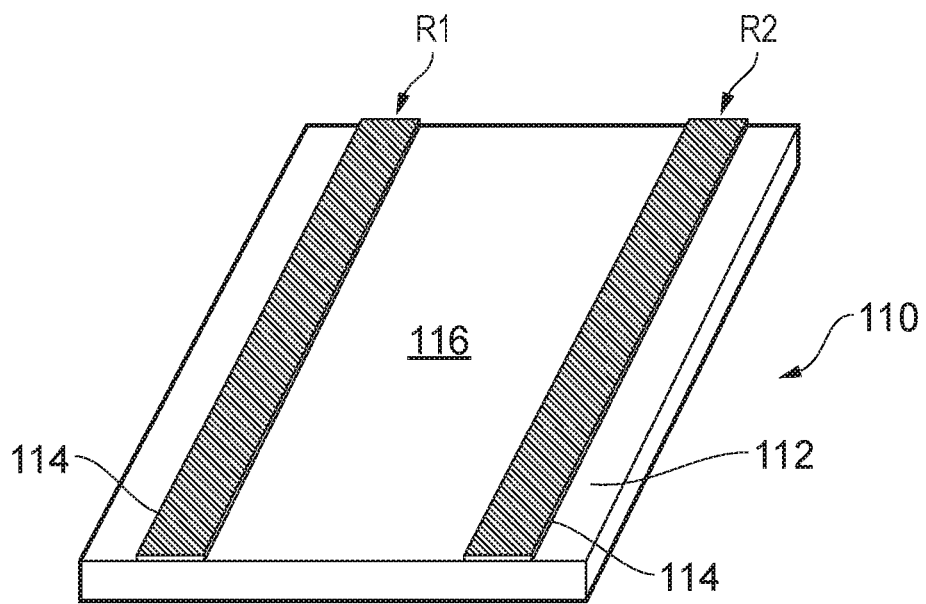
FIG. 3 is a diagrammatic perspective of a composite material made using an embodiment of the method of the present invention.

FIG. 3 illustrates a further embodiment of a composite moulding material manufactured according to the present invention to, where features that are the same or equivalent to features in embodiment of FIG. 2 have the same reference numeral but prefixed with a '1'. In relation to other embodiments described herein that have the same or equivalent features, these are referenced with the same numeral but with a respective prefix number.

In the embodiment of FIG. 3 the graphene/graphitic material 114 has been applied in two localised regions R1, R2, which are generally in the form of a simple pattern of two bands or stripes that extend across the surface 116 and generally parallel both mutually and to the sides of the fibrous layer 112 of the composite moulding material 210.

The graphene/graphitic material can be applied in any number of regions or configuration of regions and those regions may form a regular array or pattern over the surface of the fibrous layer, such as regular arrays or patterns of bands, strips, circles, spots, squares, blocks, columns, rows, and/or any array or pattern aligned along the nominal vertices of polyhedral shapes, for example hexagons, pentagons or other tessellating shapes.

In certain embodiments the graphene/graphitic material is provided at localised, preselected and predetermined regions that between them define an irregular pattern or array.

Figure 4:
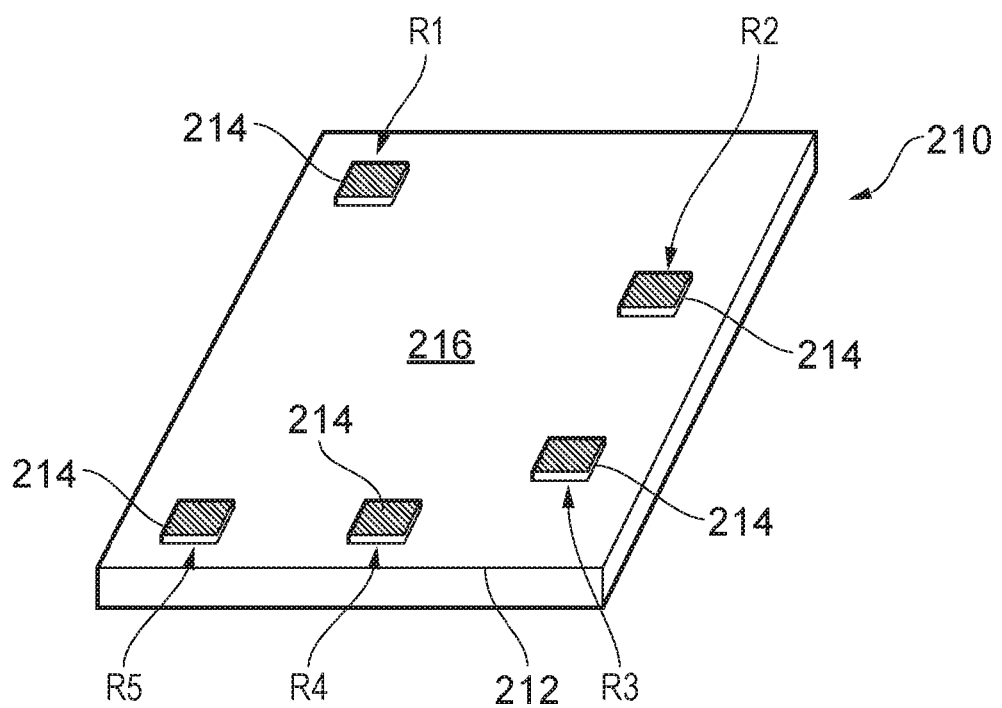
FIG. 4 is a diagrammatic perspective of a composite material made using an embodiment of the method of present invention.

FIG. 4 illustrates one such exemplary embodiment, where graphene/graphitic material 214 is provided as an irregular pattern or array of regions R1, R2, R3, R4, R5 on the surface 216 of the fibrous layer 212 of the composite moulding material 310.

In further embodiments the graphene/graphitic material is applied to the surface of the fibrous layer in an array or pattern that in part is regular and in other part is irregular.

Figure 5:
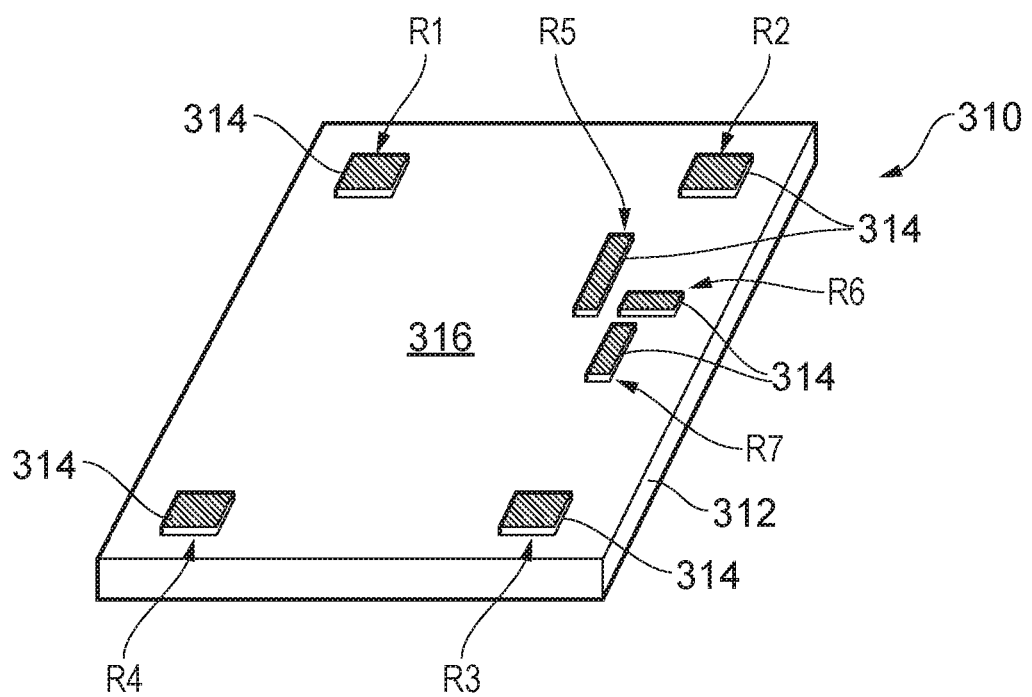
FIG. 5 is a diagrammatic perspective of a composite material according to another embodiment of the present invention.

An illustrated example of such embodiments is shown in FIG. 5, where the regions R1, R2, R3, R4 provide a regular part of the array or pattern and R5, R6, R7 represent an irregular part.

Within the scope of the present invention, the graphene/graphitic material can be applied at any configuration of localised regions on the surface of the fibrous layer and an advantage of the present invention is that it allows materials to be engineered that provide for the advantageous characteristics and properties of the graphene/graphitic material, and in particular the graphene/graphitic within the material to be realised in a selective and predetermined manner, which in turn enables a number of related advantages to be realised, as will be discussed.

It is often the case that there are particular areas or zones within composite components made using laminated fibre reinforced composites where the typical interlaminar weaknesses are or are more likely than elsewhere in the components to become problematic and the present invention provides for the selective application of graphene/graphitic material at predetermined localised regions within composite moulding materials that can be used to produce such composite components to allow composite components to be engineered such that graphene/graphitic material is present in those areas or zones, thus affording the composites the improved interlaminar fracture toughness and strength characteristics that the graphene/graphite material provides, precisely where needed and not elsewhere, where not needed.

This ability to precisely engineer composites in this way has a number of benefits.

First of all, it naturally allows for the precise placement of the graphene/graphite platelets only where really needed, which has efficiencies of cost and other manufacturing efficiencies.

It helps to avoid adding unnecessary weight, helps avoid or reduce processing problems and costs such as viscosity/particle agglomeration seen when incorporating high specific surface area nanomaterials in making intermediates such as formulated resins, films, prepreg tapes, etc. It can also facilitate or enable the use of lower viscosity and cost effective resins to impregnated fibres under lower consolidating pressures and/or quicker cycle times, reducing levels of waste or scrappage. It can help reduce the negative impact on other mechanical or physical properties and can enable existing materials and/or structural designs to be upgraded without the need for a process or design overhaul.

The precision placement of the graphene/graphitic material into the interlaminar boundary will enhance fracture toughness through crack bridging and deflection mechanisms. It is expected that this will result in a reduction in crack growth and an improvement in composite designs under fatigue. The improved fracture toughness at the interlaminar boundary enhances the performance of composite and enables a change in composite design methodologies. The use of such graphene/graphite platelet modified materials should enable composite structures to be developed to the same safety design considerations of today but with a smaller number of composite layers resulting in significant benefits in materials used and weight of the composite component.

In certain embodiments bodies of graphene/graphitic material are provided within a region and the bodies comprise an array or pattern of graphene/graphitic material on a surface of the fibrous layer, within a zone.

Figure 6:
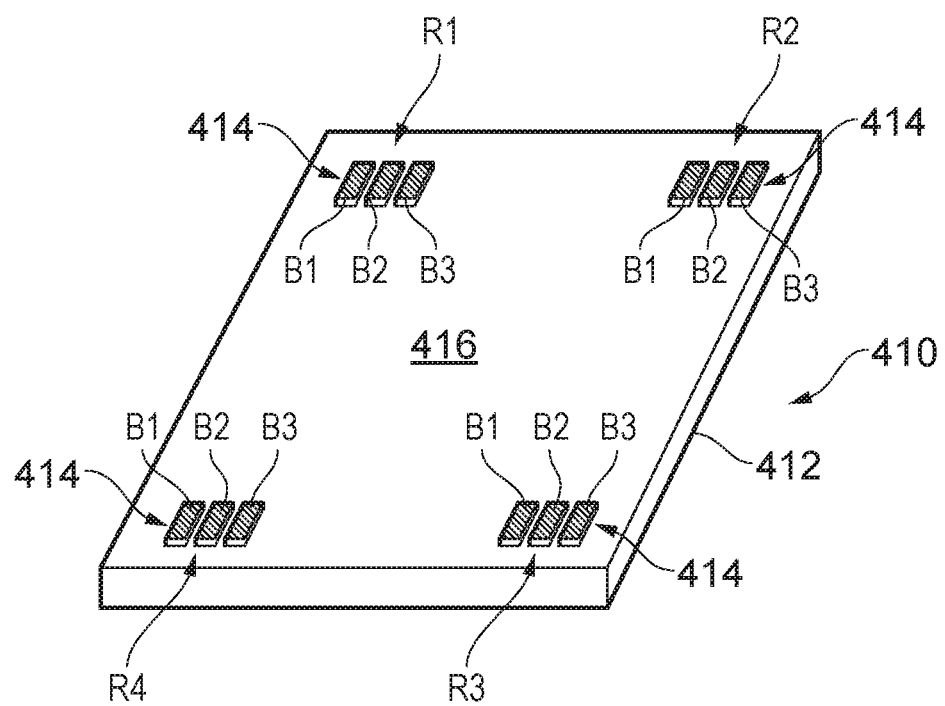
FIG. 6 is a diagrammatic perspective of a composite material according to a further embodiment of the present invention.

FIG. 6 illustrates one such embodiment in a composite moulding material 410 manufactured according to the present invention, where three discrete bodies B1, B2, B3 of graphene/graphitic material 414 are provided in each region R1, R2, R3, R4.

The regions R1, R2, R3, R4 are in a mutually regular pattern and the bodies B1, B2, B3 within each region are likewise in a mutually regular pattern. In this particular embodiment in FIG. 6, the bodies B1, B2, B3 are each a strip that run mutually parallel within the respective region R1, R2, R3, R4.

In other embodiments the pattern or array of bodies of graphene/graphitic material within the region or one or more of the regions are otherwise regular, such as regular arrays or patterns of bands, circles, spots, squares, blocks, columns, rows, or any array aligned along the nominal vertices of polyhedral shapes, for example hexagons, pentagons or other tessellating shapes.

Figure 7:
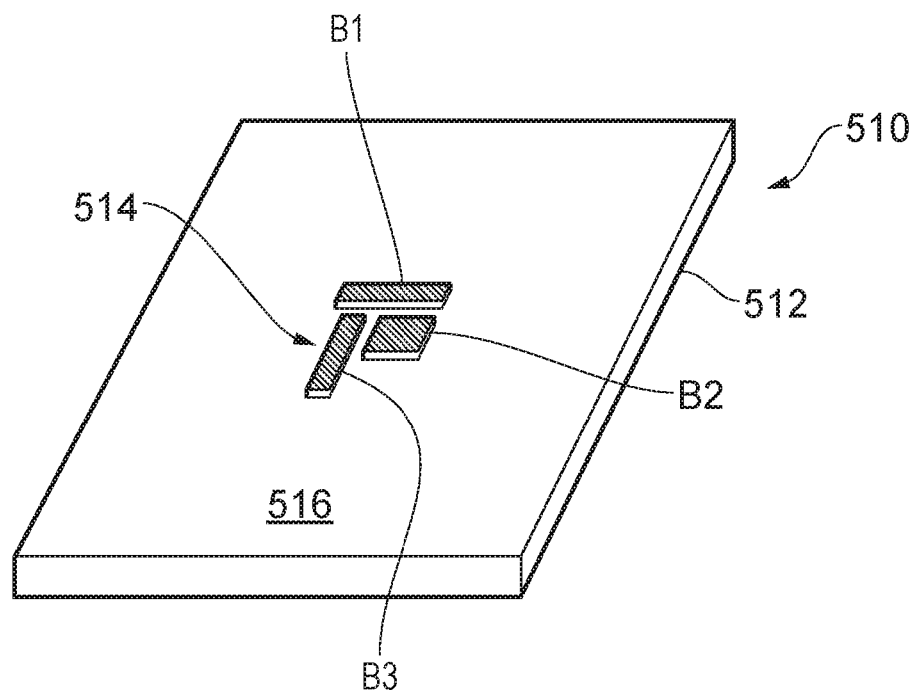
FIG. 7 is a diagrammatic perspective of a composite material according to another embodiment of the present invention.

In other embodiments the bodies within a region are applied in an array or pattern that is irregular, as illustrated by the bodies B1, B2, B3 in the composite moulding material 510 embodied in FIG. 7.

In other embodiments one or more of the regions are regular and the bodies within the other or at least one of the other regions are irregular.

Figure 8:
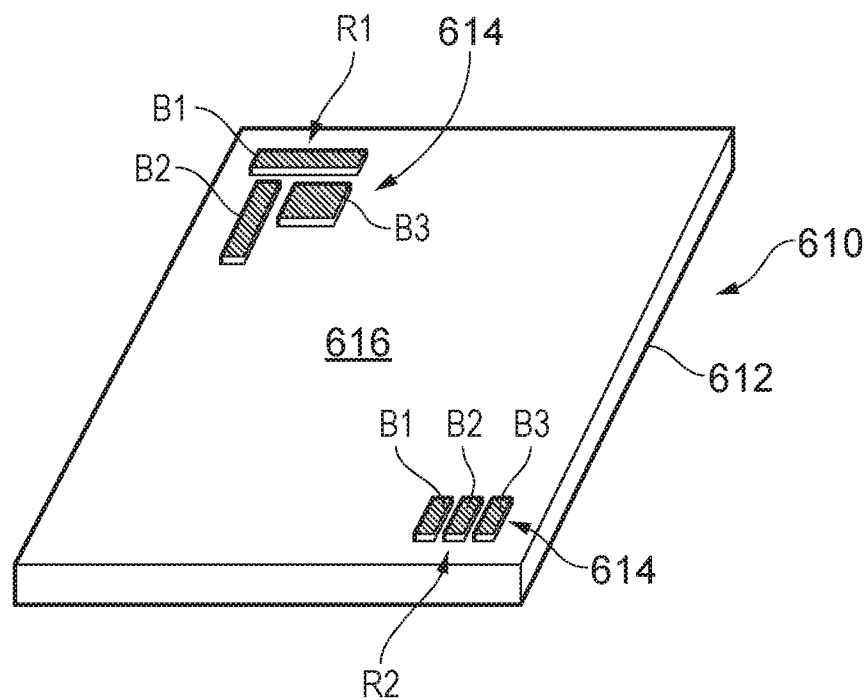
FIG. 8 is a diagrammatic perspective of a composite material according to a further embodiment of the present invention.

An illustrative example of a moulding material 610 manufactured according to the present invention according to such an embodiment is shown in FIG. 8, where the bodies B1, B2, B3 of graphene/graphitic material 614 in region R1 are in an irregular pattern or array and the bodies B1, B2, B3 of graphene/graphitic material 614 in region R2 are in a regular array of three mutually parallel strips or lines on the surface 612.

The graphene/graphitic material comprises a dispersion of graphene/graphite platelets dispersed in a carrier medium.

The graphene/graphite platelets comprise plate-like particles or platelets that comprise a plurality of layers of graphene (monolayer), each platelet having a general thickness (measured through the thickness of the platelets, generally perpendicular across the plane of the platelet) of between 0.8 and 12 nanometres in certain embodiments, of between 1.3 and 9.4 nanometres in other embodiments, and of between 2.5 and 6.0 nanometres in still further embodiments.

Graphene/graphite platelets that have been found to have particular utility in the present invention comprise up to 25 layers or up to 35 layers of graphene/graphite. In certain embodiments, the graphene/graphite platelets have between 5 and 25 or 5 and 35 layers of graphene/graphite and in other embodiments between 5 and 15 or 25 and 35 layers of graphene/graphite.

In certain embodiments the graphene/graphite platelets have a carbon content of between 40% and 99% by weight, although the chemical content will vary according to the composition of the platelets.

It is found that graphene/graphite platelets with an sp2 content of between 60% and 98% have particular utility in the present invention, although again the sp2 content will vary according to the composition of the platelets.

Typically, the oxygen content of the graphene/graphite platelets is between 1% and 50%, varying according to the composition of the platelets.

Table 1 shows the typical percentage carbon content, sp2 content and percentage oxygen, by weight, of platelets of graphene, reduced graphene oxide and graphene oxide.

TABLE 1

|  | Graphene | Reduced Graphene Oxide | Graphene Oxide |
|---|---|---|---|
| % carbon | 97-99 | 80-99 | 40-60 |
| $sp^2$ content | 98-95 | 60-95 | 40-60 |
| % oxygen | 1-3 | 5-10 | 20-50 |

In particular embodiments of composite moulding materials manufactured according to the present invention the graphene/graphite platelets have an average platelet size (as measured on the longest dimension across the general plane of the platelet) of up to 100 μm, a d90 size of between 30 μm and 60 μm and a d50 size of between 5 μm and 12 μm, or a d90 size of between 60 μm and 100 μm and a d50 size of between 10 μm and 30 μm. The particle sizes being measured using a Mastersizer 3000.

The graphene platelets may comprise one or more of graphene, graphene oxide and reduced graphene oxide, which is typically embedded in graphitic carbon.

In certain embodiments the carrier medium comprises thermoset resin which comprises one or more of epoxy, polyester(unsaturated), phenolic, vinyl ester, polyurethane, silicone, polyamide, polyamideimide, bismaleimide, cyanate ester, benzoxazine.

In other embodiments the carrier medium comprises thermoplastic resin, which in certain embodiments is selected from one or more of polyethylene (PE), polyethylene terephthalate (PET), polybutylene terephthalate (PBT), polycarbonate (PC), acrylonitrile butadiene styrene (ABS), polyamide (PA or nylon) and polypropylene (PP). High-performance thermoplastic resins—polyetheretherketone (PEEK), polyetherketone (PEK), polyamide-imide (PAI), polyarylsulfone (PAS), polyetherimide (PEI), polyethersulfone (PES), polyphenylene sulphide (PPS).

In certain embodiments the carrier medium comprises biobased resins which can comprise one or more of starch, starch caprolactone blends, polyesters—polyalkylene succinates, polyesteramides, polyhydroxy alkanoates—polyvinyl butyral—polyvinyl valeate, polyhydroxy acids—polylacticacid—polyglycolic acid, cellulose acetate, furfuralalcohol/furan resins, oil modified polyesters—vegetable oil modification—cashew nut oil modification The carrier medium can comprise deionised water and/or solvent, such as one or more of hexane, benzene, toluene, xylene, diethylether, 1,4-Dioxane, ethyl acetate, nbutyl acetate, t-butyl acetate, ethyl ethoxy propionate, propyleneglycol monomethyl ether acetate, methyl acetate, Dimethylcarbonate, tetrahydrofuran, Dichloromethane, acetone, methyl ethyl ketone, methyl isobutyl ketone, methyl propyl ketone, methyl isoamyl ketone, Acetonitrile, Dimethylformamide, dimethylsluphoxide, n-butanol, methanol, ethanol, n-propanol, isopropanol, butanol, glycols—ethylene glycol, propylene glycol, parachlorobenzotrifluoride In certain embodiments the carrier medium comprises one or more of thermoset resin, thermoplastic resin, bio-based resin, solvent and water.

In certain embodiments, the carrier medium may be a low melting point crystalline material or a low melting point semi-crystalline material such as thermoplastic high molecular weight linear saturated co-polyesters. Such co-polyesters are commercially available from Bostik, Inc., USA under the name VITEL (trade mark). When the carrier medium is or includes such materials, the or each valvejet print head applying a dispersion comprising such a carrier medium may be heated with a heating means. The heating may be to a predetermined temperature at about or above the melting point of the carrier medium. The reservoir in which the dispersion is stored may also be heated. The heating of the reservoir may be to the same temperature as the valvejet print head or to a different temperature In preferred embodiments the carrier medium is compatible with the resin in the fibrous layer and in certain embodiments the carrier medium is the same as resin in the fibrous layer.

In certain embodiments the dispersion has a graphene/graphite platelet content in the range of 0.001 wt % to 10 wt %, 0.001 wt % to 1 wt %, by weight, may be in the range 0.01 wt % to 0.5 wt %, 0.01 wt % to 5 wt % by weight.

In certain embodiments the area density of graphene/graphitic dispersion applied to the fibrous layer is in the range 1 mg/m² to 35000 mg/m², 1 mg/m² to 2000 mg/m², 10 mg/m² to 100 mg/m², 1000 mg/m² to 20000 mg/m², 1000 mg/m² to 10000 mg/m², or 10 mg/m² to 20 mg/m².

In certain embodiments the dispersion, particularly at the time of application, has a viscosity in the range 1 to 75 centipoise, 1 to 10000 centipoise, 1 to 7500 centipoise, 10 to 50 centipoise, 80 to 10000 centipoise, 80 to 7500 centipoise, 350 to 10000 centipoise, 350 to 7500 centipoise, approximately 20 centipoise, or approximately 300 centipoise. In such embodiments the dispersion typically comprises approximately 20% by weight of resin, with solvent, such as xylene or any of the other solvent carriers described herein.

In other embodiments the viscosity of the dispersion is in the range 0.9 to 50 centipoise, and in such embodiments the dispersion is typically resin free or substantially resin free, with the graphene/graphite platelets dispersed in a non-resinous carrier medium such as solvent, one being xylene, or any of the others described herein.

Viscosities discussed in connection with the present invention are as measured on a Malvern Kinexus rheometer at a shear rate ($\dot{Y}$) of 10 $s^{-1}$ at 23° C.

The graphene/graphitic material can be applied in a single stage of printing, or in a multiple stage printing process.

It has been found that applying the graphene/graphitic material as droplets with inter-droplet spacing of between 0.01 mm and 0.5 mm has particular utility in the present invention. Such printing of the graphene/graphitic material at predetermined and localised region(s), in predetermined patterns or arrays of regions or within regions as described above enables precise and accurate deposition and provision of graphene/graphitic material in composites, enabling precise engineering of composite moulding materials and the onward engineering of moulding laminates and composite components made from such composite mouldings, within which the graphene/graphitic material is localised where delamination is anticipated or considered a notable probability, where stresses are known, anticipated or considered a notable probability or otherwise where considered advantageous, within a composite component moulded from the composite moulding material, thus providing precise and localised benefit to be realised as a result of the presence of the graphene/graphitic material, including improved strength and interlaminar toughness.

In certain embodiments the fibrous layer of the composite moulding material comprises fibrous material partially or fully impregnated with curable matrix resin.

In certain embodiments the fibrous layer comprises an uncured prepreg, a partially cured prepreg, an uncured fibrous preform or a partially cured fibrous preform.

In certain embodiments the fibrous layer comprises one ply of fibrous material and in other embodiments comprises a plurality of plies of fibrous material.

In certain embodiments the fibrous layer comprises dry fibrous material (without any associated resin) and in other embodiments comprises one or more plies of dry fibrous material and one or more plies of fibrous material preimpregnated with resin.

The fibrous material of the composite moulding materials of the present invention can be known formats of fibre reinforcement typically used for fibre reinforced composites, including one or more of woven mat, unwoven mat, continuous fabric, unidirectional fabric, braided fabric, knitted fabric, woven fabric, discontinuous mat, chopped fibres, single fibre tow, impregnated slit tape, 3D woven materials, unidirectional prepreg, slit tape prepreg, tow prepreg.

The fibrous material can comprise any suitable organic and/or inorganic fibre and in certain embodiments can comprise one or more of carbon fibres, glass fibres, aramid fibres, plastic fibres, nylon fibres, terylene fibres, hemp fibres, wood fibres.

In certain embodiments the curable matrix resin of the fibrous layer comprises thermoset resin, which can be selected from one or more of epoxy, polyester(unsaturated), phenolic, vinyl ester, polyurethane, silicone, polyamide, polyamideimide, bismaleimide, cyanate ester, benzoxazine.

In other embodiments, the curable matrix resin of the fibrous layer comprises thermoplastic resin, which can be selected from one or more of polyethylene (PE), polyethylene terephthalate (PET), polybutylene terephthalate (PBT), polycarbonate (PC), acrylonitrile butadiene styrene (ABS), polyamide (PA or nylon) and polypropylene (PP). High-performance thermoplastic resins—polyetheretherketone (PEEK), polyetherketone (PEK), polyamide-imide (PAI), polyarylsulfone (PAS), polyetherimide (PEI), polyethersulfone (PES), polyphenylene sulphide (PPS).

The curable matrix resin of the fibrous layer can comprise biobased resins such as one or more of starch, starch caprolactone blends, polyesters—polyalkylene succinates, polyesteram ides, polyhydroxy alkanoates—polyvinyl butyral-polyvinyl valeate, polyhydroxy acids—polylacticacid—polyglycolic acid, cellulose acetate, furfural alcohol/furan resins, oil modified polyesters—vegetable oil modification—cashew nut oil modification In certain embodiments the curable matrix resin is the same, substantially the same or otherwise compatible with the carrier medium of the graphene material.

In certain embodiments the fibrous layer comprises a laminate structure, which comprises a plurality of plies of fibrous material.

In certain embodiments the fibrous material is the same between laminates and in other embodiments the fibrous material can be different between laminates.

Figure 9:
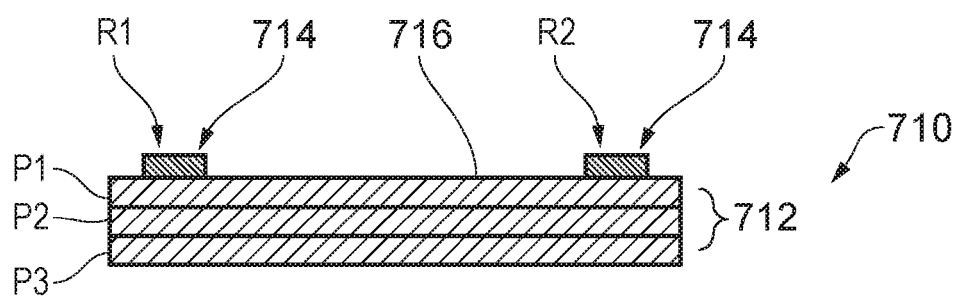
FIG. 9 is a diagrammatic cross-sectional view of a composite moulding material according to a still further embodiment of the present invention.

FIG. 9 is a diagrammatic cross-section of one exemplary embodiment of a composite moulding material 710 that has a laminate structure made up of three plies P1, P2, P3 of fibrous materials impregnated with an uncured resinous material that holds the plies together. Graphene/graphitic material 714 is shown on the surface 716 of the fibrous layer 712 at two localised regions R1, R2. The composite moulding material 710 was manufactured according to the present invention.

In certain embodiments an outer layer (not shown) is provided over the surface 716 to cover and typically to protect the graphene/graphitic material 714 applied to the surface 716. The outer layer is typically removed prior to cure, although in certain embodiments it remains during the cure process and can become part of the cured composite component.

The invention also provides moulding laminates comprising a plurality of layered composite moulding materials manufactured according to the present invention and as described above.

Figure 10A:
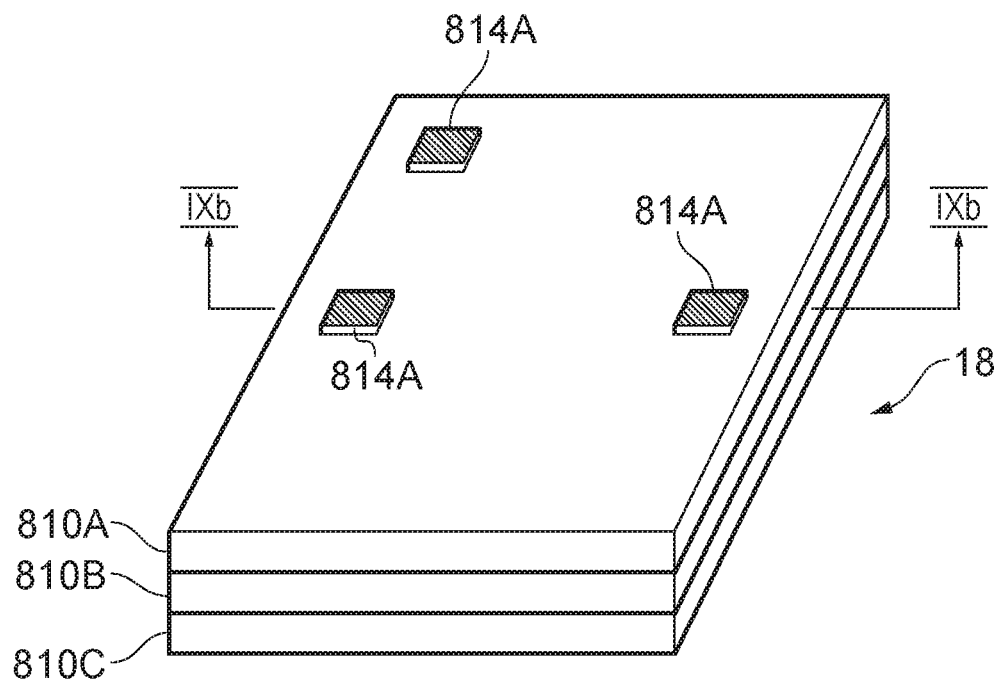
FIG. 10a is a diagrammatic perspective view of a moulding laminate according to the present invention.
Figure 10B:
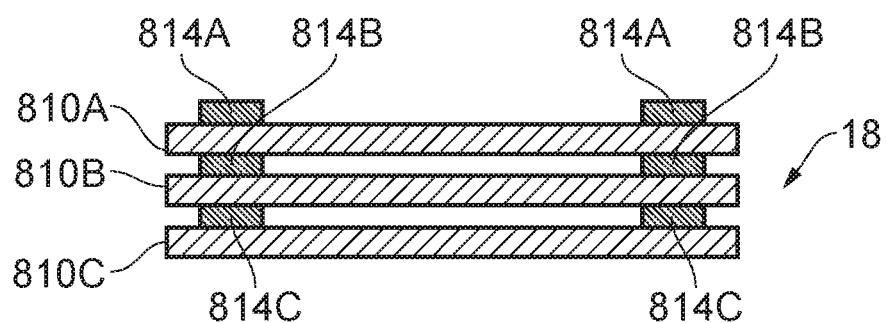

FIGS. 10a and 10b illustrate one embodiment of a moulding laminate 18 comprising three laminated layers of composite moulding material 810A, 810B, 810C.

The composite moulding materials 810A, 810B, 810C are the same and the layers are laminated directly one on top of the other so that bodies of the graphene/graphitic material 814A, 814B, 814C in the respective layers are aligned on top of each other in the direction through generally (perpendicular to) the plane of the layers.

In an alternative embodiment the composite moulding materials differ between layers, and in certain embodiments each layer is different to all other layers within the moulding laminate.

In such embodiments the location of the graphene/graphitic material can still be at the same region on the respective layers, such that when laminated the graphene/graphitic material can be in alignment, generally as illustrated in FIGS. 10a and 10b, despite the differences between in particular the fibrous layer in each composite moulding material.

In still further embodiments, the same or differing layers may be laminated so that the bodies of graphene/graphitic material on at least some of the layers are not in alignment.

Figure 11A:
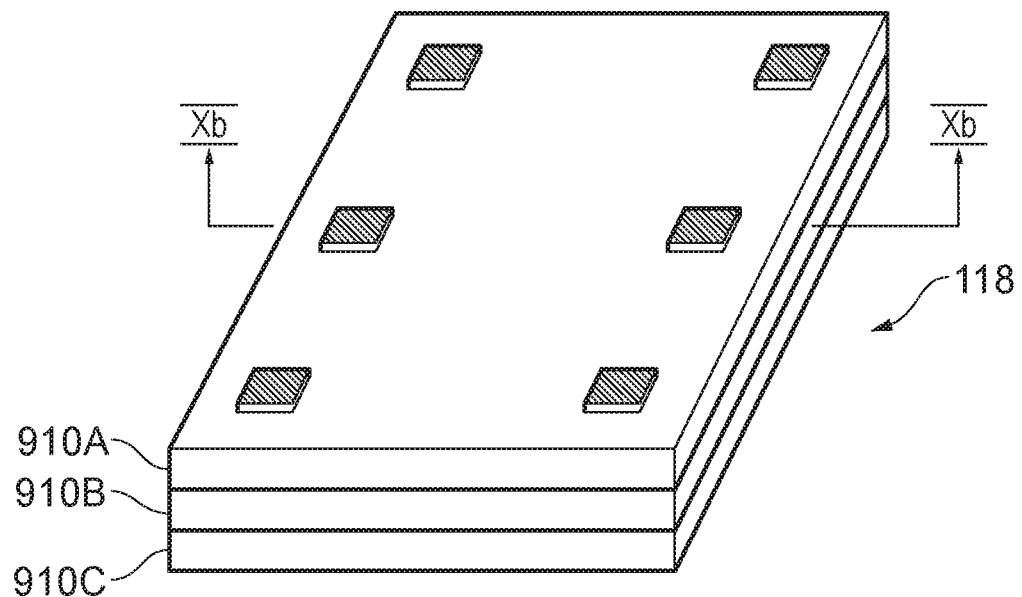
FIG. 11a is a diagrammatic perspective view of a moulding laminate according to a further embodiment of the present invention.
Figure 11B:
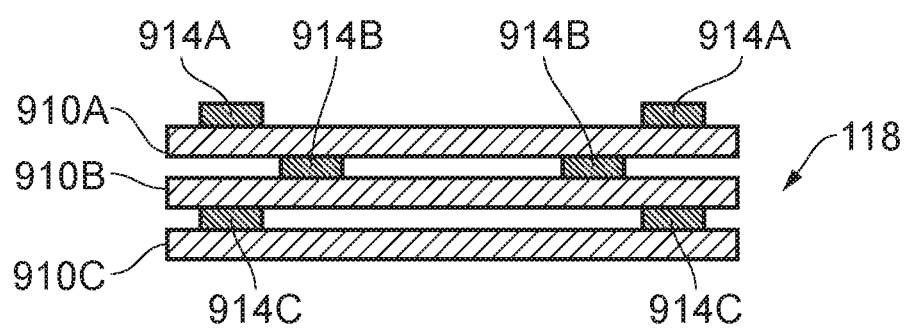
FIG. 11b is a diagrammatic cross-section of the moulding laminate of FIG. 10a along the line Xb.

FIGS. 11a and 11b illustrate a moulding laminate 118 that comprises three layers of composite material 910A, 910B, 910C, wherein composite moulding materials 910A and 910C are the same and the bodies of graphene/graphitic material 914A, 914C are generally aligned in the direction generally perpendicular to (through) the plane of the layers, and the intermediate layer 9108 has a differing or offset pattern or array of graphene/graphitic material 910B to those on composite moulding materials 910A, 910C.

Such embodiments provide differing locations of graphene/graphitic material, and thus locations of toughening and strengthening through the thickness of the laminate.

In certain embodiments an outer laminate layer is provided to cover graphene/graphitic material that would otherwise be exposed on the outer surface of the stack of layers.

Figure 12:
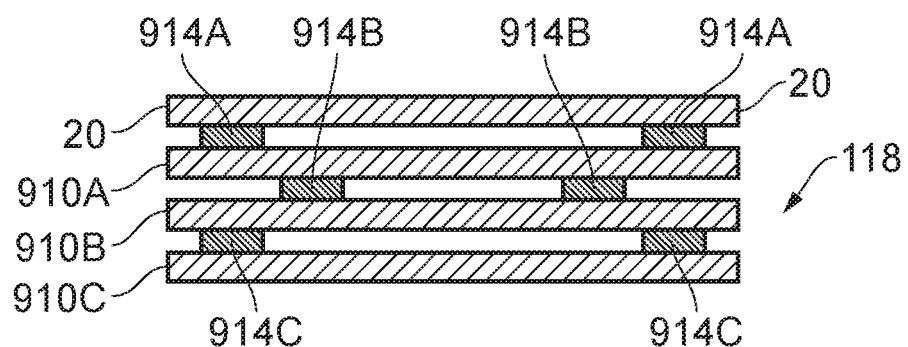
FIG. 12 is a diagrammatic cross-section of a further moulding laminate according to a further embodiment of the present invention.

FIG. 12 shows the composite moulding materials of FIGS. 11a and 11b with such an outer laminate layer 20.

In certain embodiments the outer laminate layer 20 is the same as the fibrous layer of one or all of the composite moulding materials of the moulding laminate.

In other embodiments the outer laminate layer is of a different material, such as a protective or release sheet or film.

It will be clear to those skilled in the art that the configuration, conformation and composition of the composite moulding materials and the moulding laminate can be engineered, using the precision and flexibility provided by the present invention in the selective and localised application of the graphene/graphitic material to enable a huge range of materials to be engineered that have precise, predetermined and localised strengthening and toughening, in particular interlaminar strength and toughening.

As described herein, the fibrous material of the composite moulding materials of the present invention can be of many known forms and almost unlimited shapes and sizes, the primary limitations being that the materials are of a handleable and processable size and present a surface on which graphene/graphitic material can be applied to the fibrous layer at one or more localised regions over that surface. So for example, the material can be in the form of a sheet or ply, a 3D preform, a tape, a tow.

The invention also provides a fibre reinforced composite component comprising a plurality of fibrous layers held within a cured matrix resin and graphene/graphitic material at one or more localised regions between at least two of the fibrous layers to provide interlaminar fracture toughness of said region(s).

Figure 13:
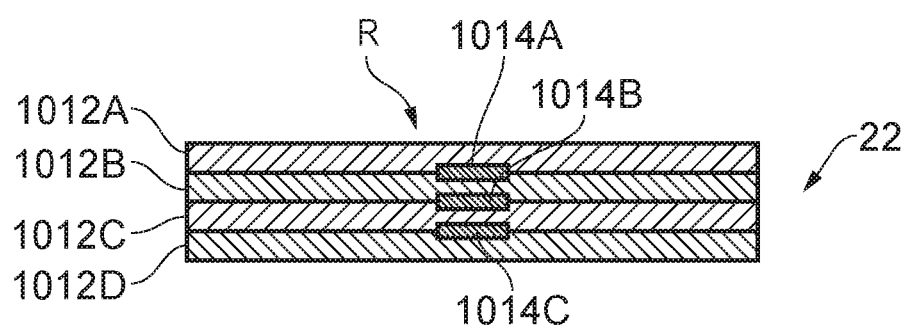
FIG. 13 is a diagrammatic cross-section of a fibre reinforced composite component according to the present invention.

FIG. 13 illustrates one embodiment of a fibre reinforced composite component 22 that comprises four fibrous layers 1012A, 1012B, 1012C, 1012D, consolidated within a matrix resin with graphene/graphitic material 1014A, 1014B, 1014C located between each of the four fibrous layers 1012A, 1012B, 1012C, 1012D at a generally central region within the component.

The presence of the graphene/graphitic material 1014A, 1014B, 1014C provides for interlaminar fracture toughness where it is located and in the embodiment shown in FIG. 13 the alignment of graphene/graphitic material 1014A, 1014B, 1014C in the direction through the thickness of the component 22 provides a central region of improved toughness extending through the thickness of the component 22.

This through-thickness interlaminar toughness provides precise, localised beneficial physical characteristics to the component 22.

This can have a number of advantages and uses, one of which is to provide for increased strength and toughness for mechanical fixings or fastenings to pass centrally through the central region (as illustrated) of the fibre reinforced composite component 22.

Figure 14:
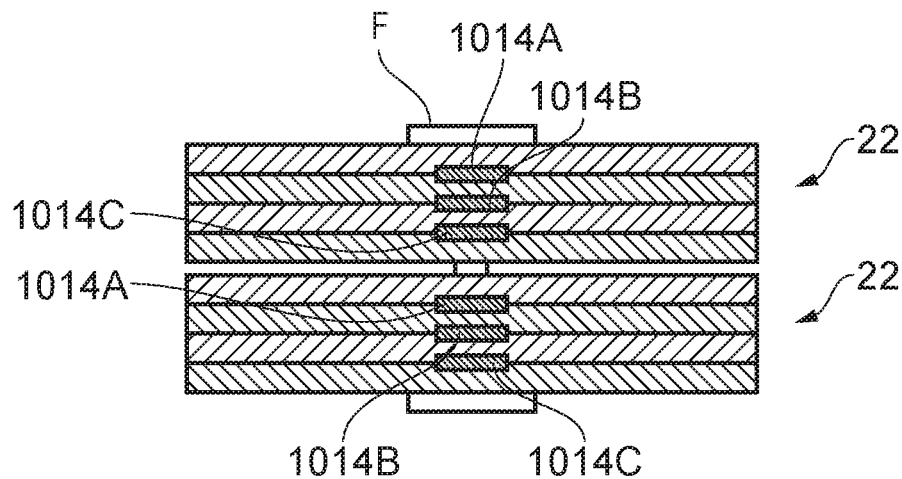
FIG. 14 is a diagrammatic cross-section of two fibre reinforced composite components according to the present invention, secured by a fastener F.

FIG. 14 is a diagrammatic illustration of a mechanical fastening F, such as a rivet, bolt or similar, that passes through the illustrated central region of two fibre reinforced composite components 22, to fasten them together.

Without the presence of the graphene/graphitic material at the location where the fastening passes through the components 22, as the fastening F is driven through the components or as the bore is drilled to accommodate the fastening F, there is significant risk of interlaminar damage and fatigue in conventional fibre reinforced composites.

The provision of the graphene/graphitic material in accordance with the present invention provides for improved interlaminar fracture toughness and resistance to such interlaminar delamination and crack propagation and thus provides components with improved, yet localised toughness and resistance to delamination.

It will be appreciated that, for example, that where a series of fasteners is required to fasten composite components together or to otherwise pass through a composite component, then in accordance with the present invention the composite moulding materials, the moulding laminates and the fibre reinforced composite components can be engineered through the selective, predetermined and precise localised provision of graphene/graphitic material at the locations where the fasteners are to be used, provides improved interlaminar toughness and strength in a specific, precise, cost effective and otherwise advantageous manner.

The present invention also provides a method of manufacturing a fibre reinforced composite component, the method comprising providing a plurality of fibrous layers, a curable matrix resin to consolidate the fibrous layers and applying a graphene/graphitic dispersion at one or more localised regions over a surface of at least one of the fibrous layers, positioning the fibrous layers so that the graphene/graphitic material is located between two adjacent fibrous layers and subjecting to conditions to cure the matrix resin around the fibrous material.

Known techniques and processes for forming fibre reinforced components can be used as part of the manufacturing method of the present invention. For example, manual and automated lay-up of plies of fibrous layers, vacuum moulding, autoclave moulding, fibre placement, pultrusion, tape laying, etc can be used.

Figure 15:
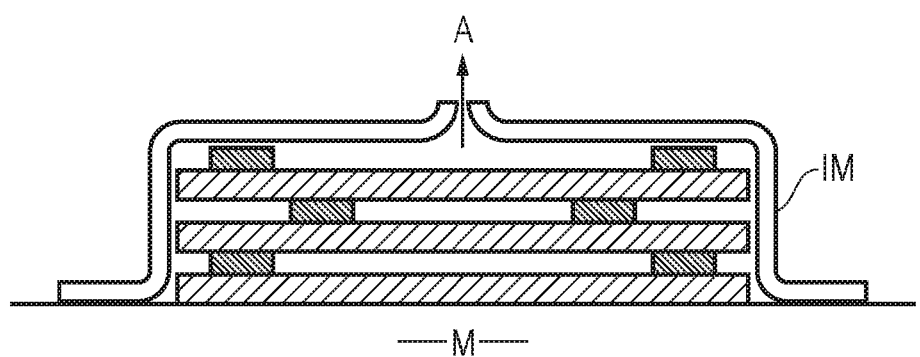
FIG. 15 is a diagrammatic cross-section of the moulding laminate of FIG. 10a, being moulded.

FIG. 15 is a diagrammatic illustration of a simple vacuum moulding process used to form a composite component from the moulding laminate 118 of FIG. 11b. The laminate 118 is sealed on the surface of a mould M, beneath an impermeable membrane IM. Air from beneath the membrane IM is drawn out, shown diagrammatically by the arrow A, as heat is applied to the laminate to consolidate the laminate and cure the matrix resin.

It will be appreciated that processes of this nature are particularly suitable for moulding composite moulding materials of particular (generally sheet-like) conformations.

Processes such as filament winding, tape laying and pultrusion can be used for moulding composite moulding materials of the present invention in the form of tows or tapes and can be used to mould composite moulding materials according to the present invention.

It will be appreciated that in accordance with the present invention, the graphene/graphitic material can be applied to a fibrous layer that is preimpregnated with resin, or to a dry fibrous layer (not preimpregnated with resin) or, within certain embodiments, of composite laminate according to the present invention, to both.

Techniques and processes for moulding preimpregnated fibrous materials and dry fibrous materials (eg resin transfer) are well known to those in the art and it will be understood that such techniques and processes can be used in the context of the present invention.

It will be appreciated that moulding laminates can be provided according to the present invention by layering any number of the same or different combinations of composite moulding materials falling within the scope of this invention, either in partial, total or non-alignment, and the nature of alignment may vary between respective layers in multi-layer laminates.

Various modifications may be made without departing from the spirit or scope of the present invention. For example, the composite moulding material with a moulding laminate may be layered so that the orientation of respective composite moulding materials may be varied, such as alternated between successive layers, so that the respective surface carrying the graphene/graphitic material alternate through the structure, enabling graphene/graphite material on adjacent layers to contact when aligned.

Features described in the preceding description may be used in combinations other than the combinations explicitly described. Although functions can be described with reference to certain features, those functions may be performable by other features, whether described or not. Although features have been described with reference to certain embodiments, those embodiments may also be present in other embodiments, whether described or not.

Whilst endeavouring in the foregoing specification to draw attention to those features of the invention believed to be of particular importance, it should be understood that the applicant claims protection in respect of any patentable feature or combination of features hereinbefore referred to and/or shown in the drawings, whether or not particular emphasis has been placed thereon.

The invention claimed is:

1. A method of manufacture of a composite molding material comprising:
applying a graphene or graphitic dispersion to a fibrous layer at one or more localized regions over a surface of the fibrous layer,
wherein the graphene or graphitic dispersion comprises:
a carrier medium, and
particles suspended in the carrier medium and selected from the group consisting of: graphene nanoplates, graphene oxide nanoplates, reduced graphene oxide nanoplates, bilayer graphene nanoplates, bilayer graphene oxide nanoplates, bilayer reduced graphene oxide nanoplates, few-layer graphene nanoplates, few-layer graphene oxide nanoplates, few-layer reduced graphene oxide nanoplates, graphene or graphite nanoplates of 6 to 14 layers of carbon atoms, graphite flakes with nanoscale dimensions and 40 or less layers of carbon atoms, graphite flakes with nanoscale dimensions and 25 to 30 layers of carbon atoms, graphite flakes with nanoscale dimensions and 25 to 35 layers of carbon atoms, graphite flakes with nanoscale dimensions and 20 to 35 layers of carbon atoms, and graphite flakes with nanoscale dimensions and 20 to 40 layers of carbon atoms,
wherein the dispersion is applied to the fibrous layer using at least one valvejet print head, and
wherein the graphene or graphitic dispersion applied to the fibrous layer has an area density in a range of 1 mg/m$^2$ to 2000 mg/m$^2$.

2. The method of manufacture of the composite molding material according to claim 1, wherein the at least one valvejet print head has a nozzle diameter of between 50 μm and 600 μm.

3. The method of manufacture of the composite molding material according to claim 2, the method further comprising pressurizing or storing the graphene or graphitic dispersion at pressures of up to around 4826.3 kPa prior to application via the at least one valvejet print head.

4. The method of manufacture of the composite molding material according to claim 1, wherein said at least one valvejet print head has a heater.

5. The method of manufacture of the composite molding material according to claim 1, wherein the graphene or graphitic dispersion is stored in a reservoir prior to application, and the reservoir is provided with a heater.

6. The method of manufacture of the composite molding material according to claim 1, wherein the at least one valvejet print head is moved relative to the fibrous layer to apply the graphene or graphitic dispersion to the one or more localized regions, or the fibrous layer is moved relative to the or each valvejet print head to apply the graphene or graphitic dispersion to the one or more localized regions.

7. The method of manufacture of the composite molding material according to claim 1, wherein said at least one valvejet print head and the fibrous layer move relative to each other to apply the graphene or graphitic dispersion to the one or more localized regions.

8. The method of manufacture of the composite molding material according to claim 7, wherein said at least one valvejet print head moves in a first direction and the fibrous layer moves in a second direction at about 90° to the first direction.

9. The method of manufacture of the composite molding material according to claim 1, wherein the graphene or graphitic dispersion is selectively applied to at least one predetermined localized region over the surface of the fibrous layer.

10. The method of manufacture of the composite molding material according to claim 1, wherein the one or more localized regions are spaced and discrete from each other.

11. The method of manufacture of the composite molding material according to claim 1, wherein at least one of the one or more localized regions covers a surface area on the fibrous layer of between 0.01 mm$^2$ and 1.5 mm$^2$.

12. The method of manufacture of the composite molding material according to claim 1, wherein the graphene or graphitic dispersion is applied in an array or pattern within the one or more localized regions over said surface of the fibrous layer.

13. The method of manufacture of the composite molding material according to claim 12, wherein the array or pattern is a regular array, an irregular array, or an array which is regular in part and irregular in other part.

14. The method of manufacture of the composite molding material according to claim 1, wherein the graphene or graphitic dispersion comprises platelets comprising a plurality of layers of graphene or graphite having an average thickness of between 0.8 and 12 nanometres.

15. The method of manufacture of the composite molding material according to claim 1, wherein the graphene or graphitic dispersion comprises platelets of up to 35 layers of graphene.

16. The method of manufacture of the composite molding material according to claim 1, wherein the carrier medium comprises one of a resin, a thermoset resin, an epoxy resin, a polyester(unsaturated) resin, a phenolic resin, a vinyl ester resin, a polyurethane resin, a silicone resin, a polyamide resin, a polyamideimide resin, a bismaleimide resin, a cyanate ester resin, a benzoxazine resin, a thermoplastic resin, a polyethylene (PE) resin, a polyethylene terephthalate (PET) resin, a polybutylene terephthalate (PBT) resin, a polycarbonate (PC) resin, an acrylonitrile butadiene styrene (ABS) resin, a polyamide (PA or nylon) resin, a polypropylene (PP) resin, a high-performance thermoplastic resin, a polyetheretherketone (PEEK) resin, a polyetherketone (PEK) resin, a polyamide-imide (PAI) resin, a polyarylsulfone (PAS) resin, a polyetherimide (PEI) resin, a polyethersulfone (PES) resin, a polyphenylene sulphide (PPS) resin, a biobased resin, a biobased resin comprising starch, a biobased resin comprising a starch caprolactone blend, a biobased resin comprising polyesters, a biobased resin comprising a polyalkylene succinate, a biobased resin comprising a polyesteramide, a biobased resin comprising a polyhydroxy alkanoate, a biobased resin comprising a polyvinyl butyral, a biobased resin comprising a polyvinyl valeate, a biobased resin comprising a polyhydroxy acid, a biobased resin comprising a polylactic acid, a biobased resin comprising a polyglycolic acid, a biobased resin comprising a cellulose acetate, a biobased resin comprising a furfural alcohol, a biobased resin comprising a furan resin, a biobased resin comprising an oil modified polyester, a biobased resin comprising a vegetable oil modification, a biobased resin comprising a cashew nut oil modification, deionised water, a solvent, hexane, benzene, toluene, xylene, diethylether, 1,4-dioxane, ethyl acetate, n-butyl acetate, t-butyl acetate, ethyl ethoxy propionate, propyleneglycol monomethyl ether acetate, methyl acetate, dimethylcarbonate, tetrahydrofuran, dichloromethane, acetone, methyl ethyl ketone, methyl isobutyl ketone, methyl propyl ketone, methyl isoamyl ketone, acetonitrile, dimethlyformamide, dimethylsluphoxide, n-butanol, methanol, ethanol, n-propanol, isopropanol, butanol, ethylene glycol, propylene glycol, parachlorobenzotrifluoride, a low melting point crystalline material or a low melting point semi-crystalline material, a thermoplastic high molecular weight linear saturated co-polyester, or a mixture or combination of two or more of the aforesaid.

17. The method of manufacture of the composite molding material according to claim 1, wherein the graphene or graphitic dispersion has a graphene or graphite content in the range 0.001 wt % to 10 wt %.

18. The method of manufacture of the composite molding material according to claim 1, wherein the graphene or graphite dispersion has a viscosity of 1 to 10000 centipoise as measured at a shear rate ($\dot{Y}$) of $10 \ s^{-1}$ at 23° C.

19. The method of manufacture of the composite molding material according to claim 1, wherein the graphene or graphitic dispersion is applied in droplets, wherein an inter-droplet spacing is between 0.01 mm and 0.5 mm.

20. The method of manufacture of the composite material according to claim 1, wherein the graphene or graphitic dispersion is applied so that the graphene or graphitic dispersion forms one or more islands on the surface of the fibrous layer, the one or more islands being surrounded by one or more areas of fibrous material deficient in graphene or graphitic dispersion.

21. The method of manufacture of the composite material according to claim 1, wherein the graphene or graphitic dispersion comprises platelets comprising:
   a carbon content of between 40% and 99% by weight of the platelets, and
   an oxygen content between 1% and 50% by weight of the platelets.

* * * * *